April 21, 1964

E. R. SANDERS 3,130,270

RECEIVER AMPLIFIER

Filed Jan. 15, 1962

INVENTOR
EARL R. SANDERS
BY Earnest Carl Edge

United States Patent Office 3,130,270
Patented Apr. 21, 1964

3,130,270
RECEIVER AMPLIFIER
Earl R. Sanders, 920 SE. 11th Court,
Fort Lauderdale, Fla.
Filed Jan. 15, 1962, Ser. No. 166,060
1 Claim. (Cl. 179—1)

This invention relates to amplifiers and more specifically to a receiver amplifier for use on telephone handsets.

Persons who are hard of hearing have great difficulty in using the conventional telephone handset due to the fact that the output of the receiver is maintained at a level for individuals of normal hearing.

There are telephone amplifiers now on the market in which the receiver is placed on a cradle type device and the sound coming from the handset is amplified into the room. The main objection to this type of device is that it affords no privacy to the individual receiving the telephone call. Everyone in the room hears the conversation coming from the telephone.

It is an object, therefore, of the present invention to provide a handset receiver amplifier which can be used by individuals who are hard of hearing which will provide a strong enough signal to be heard but still maintains the privacy desired by the listener.

Another object of the invention is to provide a receiver amplifier which is small in size and can be conveniently handled by the user.

A further object of the invention is to provide a telephone receiver amplifier which is of such dimensions that it can be handily placed and held between the handset and the individual's ear.

Another object of the invention is to provide a receiver amplifier in which an induction coil in the receiver-contacting area of the amplifier electronically amplifies the signal picked up by the induction coil and then transforms the amplified signal into stronger sound waves than those emanating from the receiver.

A still further object of the invention is to provide a telephone receiver amplifier which will not pick up extraneous noises from the atmosphere surrounding the location of the telephone.

Another object of the present invention is to provide a receiver amplifier which can be conveniently carried by the individual so that at any time and at any place he may make adequate use of the telephone.

A still further object of the present invention is to provide a receiver amplifier which may be used with the presently popular French type of handset or with what is now considered old fashioned, the two-piece type telephone.

In this specification and the accompanying drawings there has been shown and described a preferred embodiment of my invention; it is to be understood that this is not intended to be exhaustive nor limiting of the invention, but on the contrary, is given for purposes of illustration in order that others skilled in the art may fully understand the invention and the principles thereof and the manner of applying it in practical use so that they may modify and adapt it in various forms, each as may be best suited to the conditions of a particular use.

Further objects, advantages, uses and adaptations of the invention will be apparent from the following description taken in conjunction with the accompanying drawing, having like parts similarly indicated, wherein.

Figures 1, 2, 3:
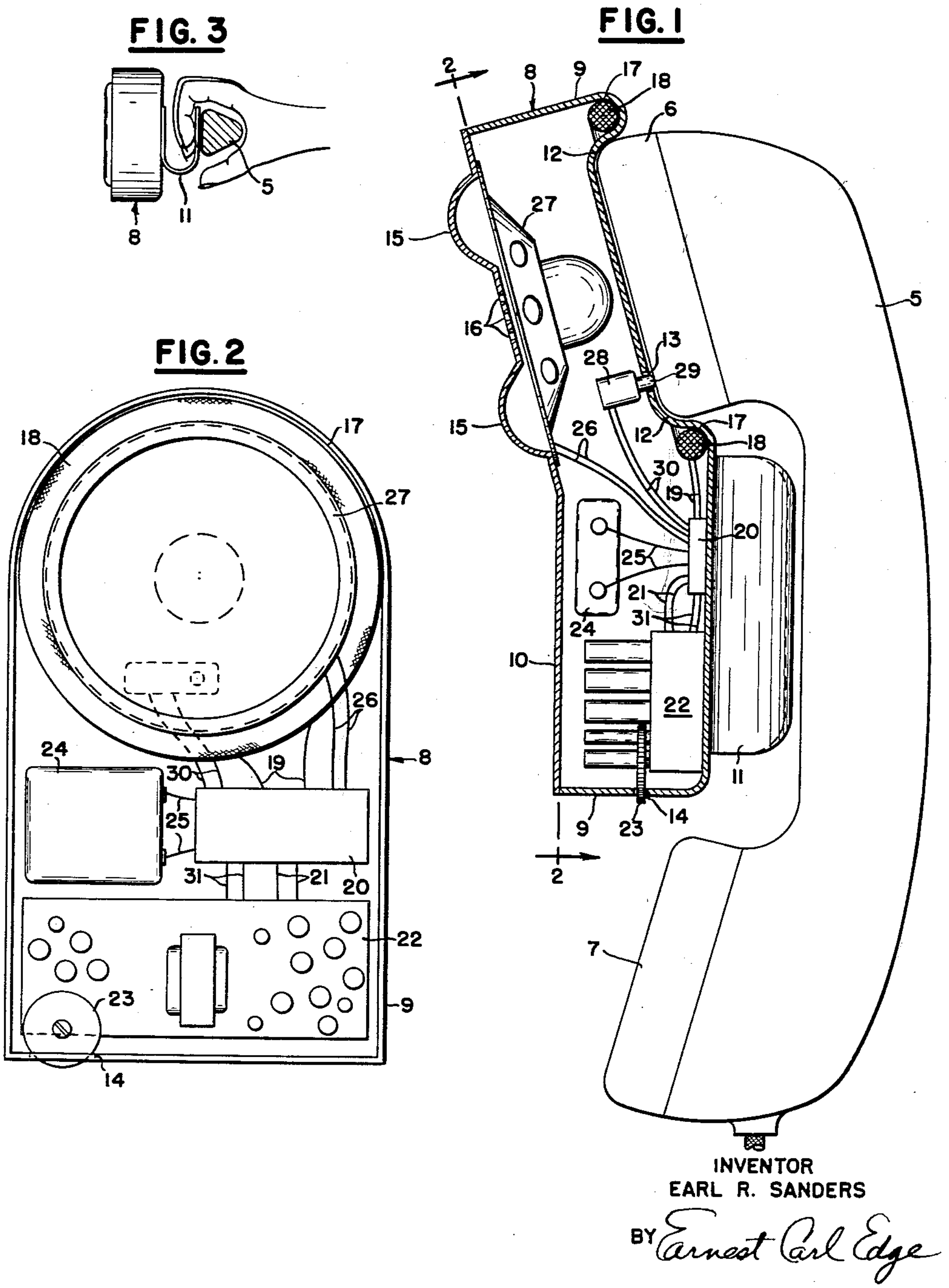
FIGURE 1 is a side elevational view showing the telephone receiver amplifier in operable position on an ordinary telephone handset with the receiver amplifier shown in cross section.
FIGURE 2 is a front elevational view with the cover removed and taken on the lines 2—2 of FIGURE 1.
FIGURE 3 is a side elevational view with the handset shown in cross section and showing the way the amplifier and handset are grasped by the hand of the listener.

Referring to FIGURE 1, telephone handset 5 is shown with the usual receiver portion 6 and transmitter portion 7. Telephone receiver amplifier 8 is shown in operable position in relation to the telephone handset 5.

Amplifier 8 is shown as enclosed in a housing comprised of a receptacle portion 9 and a cover portion 10 suitably fastened together for easy removal of cover 10 to permit access to the amplifier components.

Attached to the receptacle portion 9 of the housing is hand grip 11 so designed that it fits in the inside of the telephone handset 5. The entire housing may be molded or formed of any suitable material such as plastic, Bakelite, or a combination of metal with non-metallic materials.

The bottom of receptacle 9 has a circular indentation 12 of substantially the same diameter as the receiver end 6 of handset 5. Depth of indentation 12 is sufficient to allow induction pickup coil 18 to efficiently receive the sound modulated electromagnetic impulses from the coils in the receiver. The location of the pickup coil is not necessarily limited to the location shown but can be located wherever efficient pickup of the sound modulated impulses can be secured. Due to indentation 12, the receptacle 9 has a circular channel 17, the purpose of which is explained in detail below.

The bottom surface of circular indentation 12 is provided with an opening 13 through which push button 29 of receiver-actuated switch 28 protrudes. Operation of switch 28 is described in detail later in the specification.

On the side of the receptacle 9 farthest away from the receiver 6 is another opening 14 through which volume control member 23 protrudes.

Cover 10 of receptacle 9 is provided with a circular indentation 15 to substantially conform to the configuration of the receiver of a telephone handset. Within the circular indentation 15 are openings 16 through which the amplified sound travels.

The entire receptacle 9 and cover member 10 are angled obliquely at substantially the same angle the receiver portion of a handset is angled in relation to the hand grip portion of the handset.

Lying in circular channel 17 of receptacle 9 is induction coil 18. As shown in FIGURE 2 it is circular in shape and when placed in channel 17 completely surrounds indentation 12 into which receiver 6 fits. Induction coil 18 is suitably connected by connectors 19 to terminal block 20.

Attention is called to the fact that in my device an induction coil is used as a pickup thereby eliminating any pickup of foreign sound waves.

Also connected to terminal block 20 by connectors 21 is an electronic audio amplifier 22. Although the electronic audio amplifier is shown in the drawing as consisting of a transistor amplifying system, the invention is not limited to such but any suitable electronic amplifier which could amplify the electromagnetic impulses received by the pickup coil could be substituted therefor.

Attached to electronic amplifier 22 is volume control wheel 23. The bottom of volume control wheel 23 extends through the opening 14 in housing 8 to permit easy control of the volume of the output of the telephone receiver amplifier. The control wheel 23 may be marked by numbers, colors, or any suitable means, to indicate to the user of the device at what level the volume control is set.

Power supply 24 shown here as a battery but not limited thereto, is also connected to terminal block 20 by connectors 25. Another pair of connectors 26 are used to connect a voice reproducer 27 to terminal block 20. The voice reproducer shown is of the permanent magnet type but the reproducer is not necessarily limited to this type.

Mounted on the inside of the casing 9 is receiver-actuated switch 28 provided with push button 29 which extends through opening 13 provided therefor. Switch 28 is connected to terminal block 20 by connectors 30.

Operation of my telephone receiver amplifier is as follows:

When the telephone rings it is picked up by the cradle of the handset. With the same hand that grasps the handset, the individual also grasps the hand grip of the receiver amplifier. This is clearly illustrated in FIGURE 3 where the handset is shown in cross section.

As the two are placed together the receiver end 6 of the handset 5 is placed in circular indentation 12 of housing 9. The handset receiver is pushed against push button 29 which activates switch 28. Button 29 is urged outwardly at all times by means of a spring, not shown. Activation of switch 28 causes power to flow from power supply source 24 through terminal block 20 and energizes the electronic amplifier. Induction pickup coil 18 picks up the magnetic signal emitted by the coil in the receiver end of the handset. Due to the fact that an induction coil is used as a pickup, no outside noises are received as in an ordinary hearing aid.

The signal picked up by the coil 18 is then transmitted through terminal block 20 to the electronic amplifier 22. Here the signal is amplified, the amount of amplification depending on the setting of the volume control wheel 23, and is transmitted back through terminal block 20 by way of connectors 31. From terminal block 20 it goes through connectors 26 to speaker 27. In the speaker 27 the electronic impulse is transformed into sound waves which travel out through holes 16 of cover 10 and enter the ear of the listening individual.

Although my telephone receiver amplifier is shown as made of molded plastic it may be formed of any desirable metallic or non-metallic material or combination thereof.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

In a receiver amplifier of the type adapted to be used in a position contiguous to but detached from the receiver portion of a conventional telephone handset, (*a*) a housing comprising a body portion and a cover portion, (*b*) a hand grip extending outwardly from said body portion on the side opposite said cover portion, (*c*) the body portion of said housing being angulated to conform to the angulation between the receiving end of an ordinary telephone handset and the hand grip portion of said handset;

(*d*) an indentation adapted to receive a tedephone receiver on the same side of said body portions as said hand grip, (*e*) a receiver actuated switch in said indentation, (*f*) a pickup coil mounted in said body portion near the receiver indentation, (*g*) said pickup coil mounted in a channel surrounding the indentation adapted to receive the telephone receiver, (*h*) an amplifier connected to said pickup coil, (*i*) a receiver unit including a speaker connected to said amplifier, (*j*) a power supply connected to said amplifier, (*k*) openings in said housing cover portion for transmission of sound waves from the speaker of said receiver unit, and (*l*) a volume control connected to said amplifier and extending through the body portion of the housing.

References Cited in the file of this patent

UNITED STATES PATENTS

| | | |
|---|---|---|
| 2,544,027 | King | Mar. 6, 1951 |
| 2,847,506 | Gray et al. | Aug. 12, 1958 |